Dec. 14, 1965     S. W. ALDERFER     3,223,568
PRODUCTION OF FOAMED PLASTIC MATERIALS
Filed Jan. 30, 1961     4 Sheets-Sheet 1
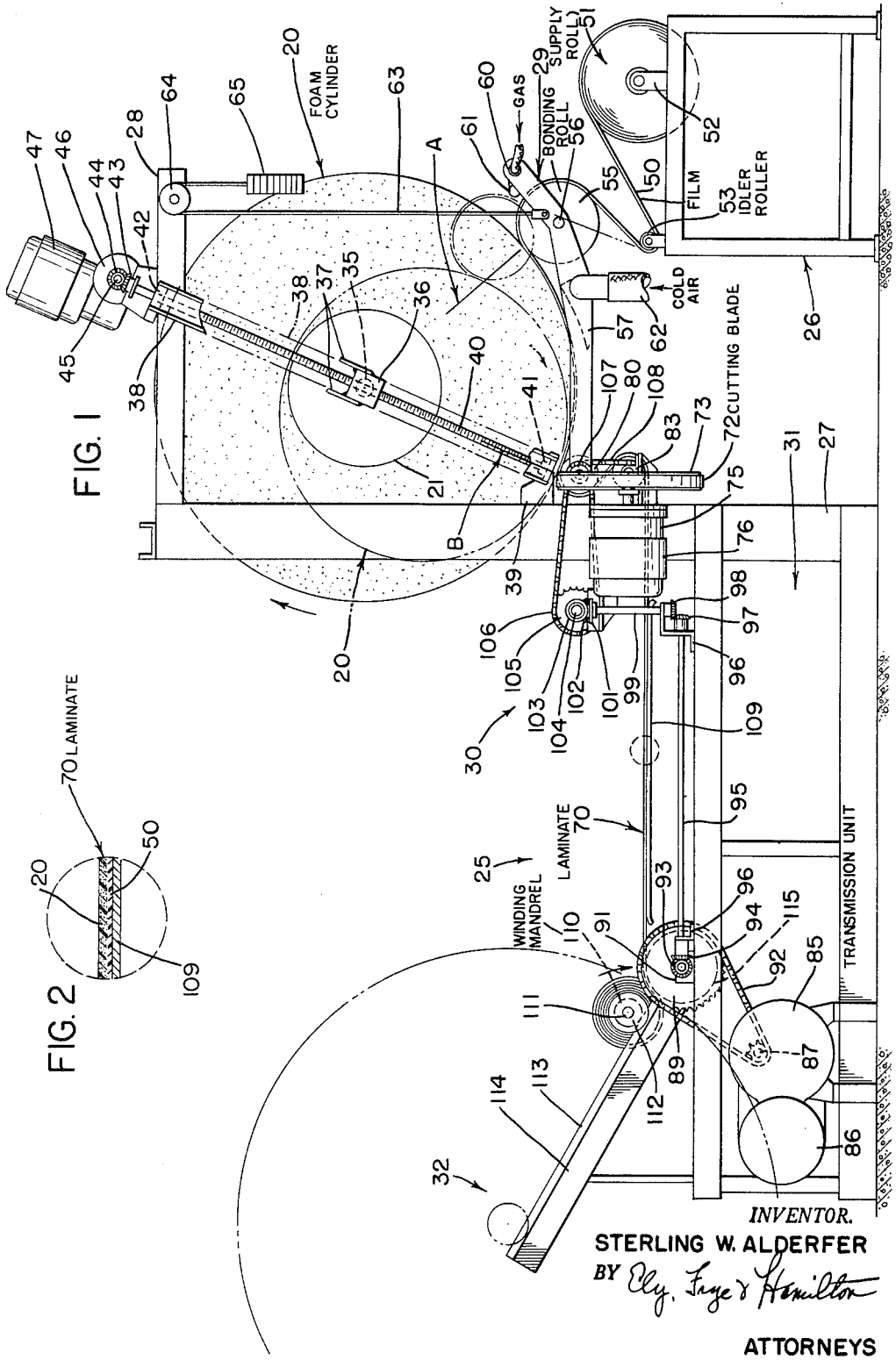
INVENTOR.
STERLING W. ALDERFER
BY Ely, Frye & Hamilton
ATTORNEYS Dec. 14, 1965 S. W. ALDERFER 3,223,568
PRODUCTION OF FOAMED PLASTIC MATERIALS
Filed Jan. 30, 1961 4 Sheets-Sheet 2
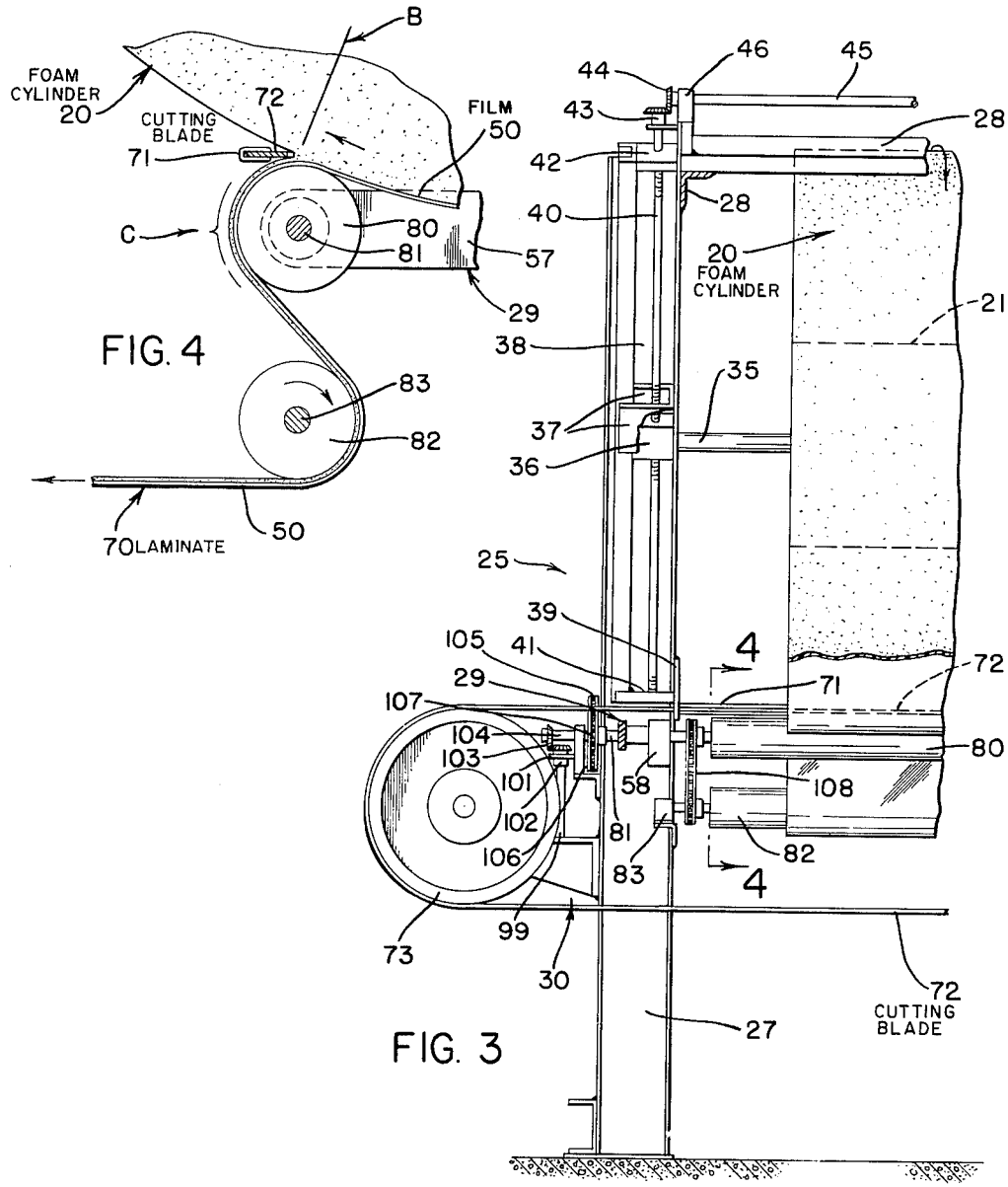
INVENTOR.
STERLING W. ALDERFER
BY Ely, Frye & Hamilton
ATTORNEYS

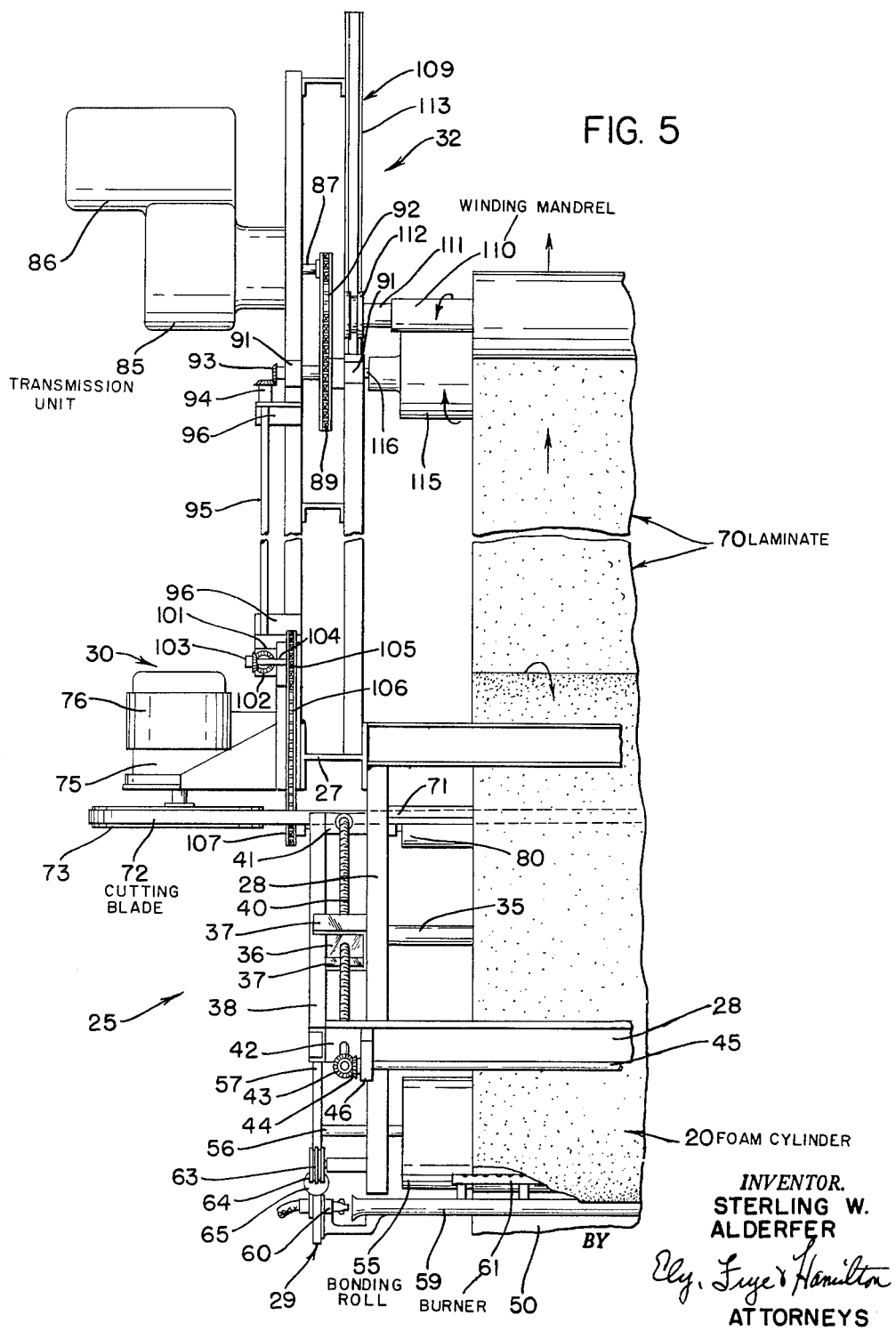

Dec. 14, 1965    S. W. ALDERFER    3,223,568
PRODUCTION OF FOAMED PLASTIC MATERIALS
Filed Jan. 30, 1961    4 Sheets-Sheet 4

INVENTOR.
STERLING W. ALDERFER
BY *Hamilton & Cook*
ATTORNEYS

United States Patent Office 3,223,568
Patented Dec. 14, 1965

3,223,568
PRODUCTION OF FOAMED PLASTIC
MATERIALS
Sterling W. Alderfer, 464 N. Portage Path, Akron, Ohio
Filed Jan. 30, 1961, Ser. No. 85,748
2 Claims. (Cl. 156—255)

The present invention relates to production of plastic foams. More particularly, the invention relates to improved concepts for the production of foamed plastic materials. Specifically, the concepts of the invention are particularly adapted for the manufacture of relatively thin and preferably reinforced or backed sheets or mats of foamed plastic.

Heretofore, sheets or mats of foamed plastic materials have either been cast in a relatively thick foam, or else have been cut from large rectilinear masses of foamed plastic. The production of extremely thin sheets of foamed plastic material by a veneering technique has not been known to the extent of successful practice prior to this invention.

Therefore, it is an object of the present invention to provide for the manufacture of a relatively thin and preferably reinforced or backed sheet or mat of foamed plastic in large volume and at minimum expense.

Further, it is an object of the present invention to adopt veneering techniques for a cost-saving and efficient production of a relatively thin foamed plastic material.

Still further, it is an object to manufacture a reinforced sheet of foamed plastic that may be wound or coiled for storage or shipment.

These and other objects, as well as the advantages of the invention, will be apparent in view of the following disclosure taken in conjunction with the drawings.

In the drawings:

FIG. 1 is a view in elevation of a preferred form of apparatus suitable for practice of the invention;

FIG. 2 is an enlarged view, taken as indicated on FIG. 1, showing detail of a reinforced sheet of foamed plastic manufactured according to the invention;

FIG. 3 is a fragmentary view in section looking to the rear of the apparatus of FIG. 1;

FIG. 4 is a detail taken substantially on line 4–4 of FIG. 3; and,

FIG. 5 is a fragmentary top plan view of the apparatus of FIG. 1.

Figure 6:
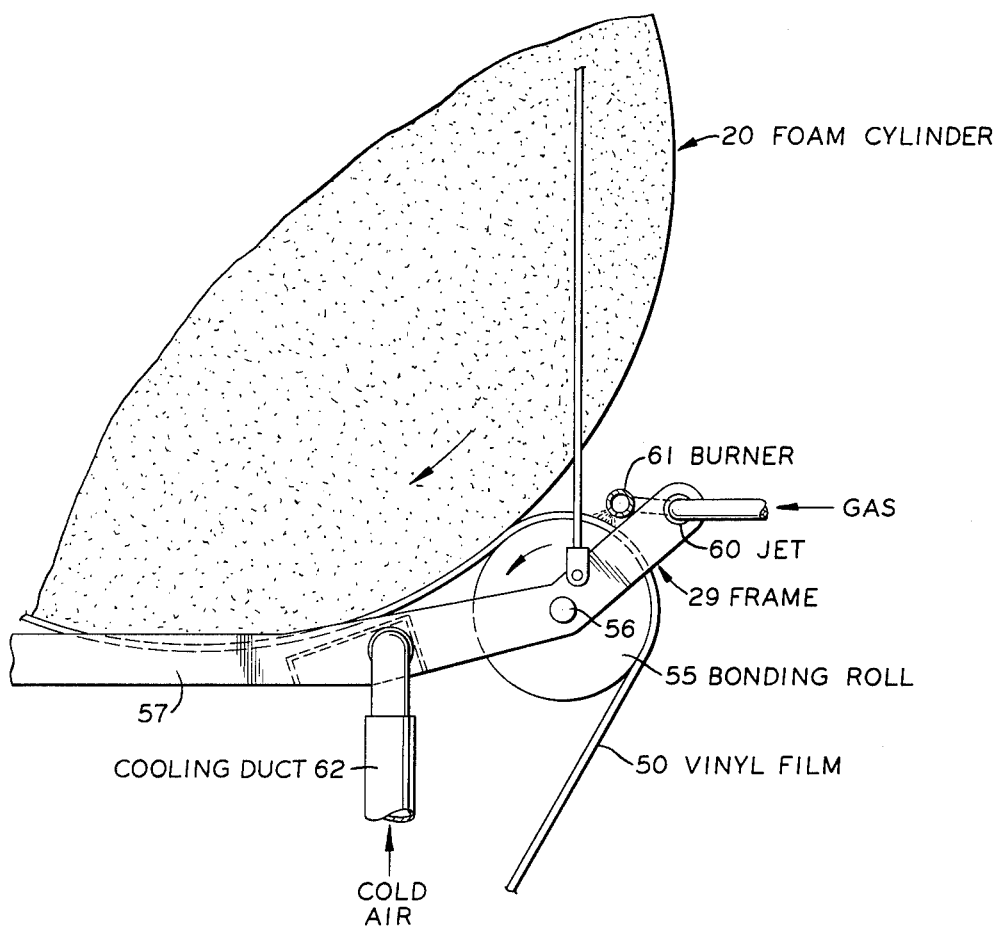
FIG. 6 is an enlarged view showing detail of the burner shown in FIG. 1.

The invention relates to method and apparatus wherein a relatively thin sheet of foamed plastic material is produced from a rotatably mounted cylinder or drum of foam, continuously bonding or adhering to the surface of the cylinder when rotating a film or layer of backing material, and continuously cutting into the surface of the cylinder to sever a laminate of the foam and film backing. The cylinder of foam is preferably rotated during the operation by a force applied to the surface of the film bonded on the cylinder or originating remote from or outwardly of the cylinder and transmitted to the cylinder through the severed web of foam and film laminate.

The foamed plastic materials used in the practice of this invention may be produced from those known classes of compounds which have been chemically foamed or reacted, alone or in combination with others, with or without a catalyst or a gasifiable substance, so as to form a resilient foam material having a defined cellular structure and structural integrity. It will be noted that the invention may be practiced using plastic foams which, when in the form of relatively thin sheets, are normally lacking in significant tensile or tear strength. By way of example, the large diameter cylinders or drums of foamed plastic material indicated generally by the numeral 20 and preferably having a core element 21, may be a urethane foam (also known to the art as "polyurethanes" or "isocyanates"), a foamed latex, various forms of modified polyvinyl chloride resins in which the plastisol contains a blowing agent, certain resilient forms of polystyrene, etc.

The apparatus shown in the drawings as suitable for practice of the invention is indicated generally by the numeral 25. From front to rear (looking from right to left in FIG. 1), the principal frame or structural elements of the apparatus 25 include a film supply stand 26, a foam cylinder support having upright members 27 with extending or overhanging members 28, a pivoted structure 29 carrying the film bonding elements, a fixed structure 30 mounting a cutting blade and drive mechanism, an under structure 31 suporting a runout table, and a take up mechanism 32 for a severed laminate of foam and film.

The cylinder of foam 20, which may be, for example, four and a half feet (4½') in width and three feet (3') in diameter and having a twelve inch (12") diameter core, is mounted on axle 35 suitably adapted to engage the core element 21 of the cylinder. The axle 35 is supported at either end in trunnion blocks 36. As shown, each end of the axle 35 is securely mounted in a block 36 and the core 21 of a cylinder 20 would be adapted in a suitable manner to freely rotate around the axle. Alternatively, the axle 35 could be secured to the cylinder core 21 and rotate in journals or bearings carried by the blocks 36. In any event, the cylinder 20 is intended to rotate freely about an axis defined by axle 35, is a free or idling body and is not positively driven or rotated by a force transmitted through the axle 35.

The cylinder axle blocks 36 are each adjustable having wing flanges 37 slidably engaging a slide channel 38. Each channel 38 is secured at the upper end to a frame member 28 and at the lower end to a bracket 39 on frame member 27 above the drive mounting structure 29. Extending longitudinally of each channel 38 and threadedly engaging an axle block 36 is a cylinder adjusting rod 40. The lower end of each adjusting rod 40 is rotatably received in a journal plate 41 at the lower end of a channel 38. The upper end of each rod 40 extends rotatably through a journal cap 42 at the upper end of channel 38 and terminates in a bevel gear 43. Each adjusting rod gear 43 meshes with a mating bevel gear 44 carried on the end of a horizontal cross shaft 45 journaled in a small housing 46 on the top of each frame member 28. A conventional reduction transmission unit and electric motor 47 is connected to the cross shaft 45. In operation the motor 47 is continually driven to rotate the adjusting rods 40 and gradually lower the cylinder axle 35 at a predetermined rate as the diameter of a foam cylinder 20 decreases during the article producing operations. The angle at which the channels 38 and the rods 40 are inclined (e.g. approximately 30° from horizontal as shown) is chosen so that the angle of incidence of the cutting blade 72, (described below) to the surface of cylinder 20 will remain substantially constant as the diameter of the foam cylinder decreases.

The film or thin layer of backing or reinforcing material 50, continuously bonded to the surface of a foam cylinder 20 in the area of the imaginary line indicated by the letter A, is supplied for the article producing operation from a roll 51 having an axle supported by uprights 52 on the frame stand 26. The film 50 may be a moisture or liquid impervious material, such as polyvinyl chloride resin or "vinyl" sheet, polytetrafluoroethylene or a polyethylene. Alternatively, the film 50 could be a thin gauze or wedding of cotton or synthetic fibres. In any event, the film 50 is preferably very thin (e.g. 10 mil. vinyl film) and may be in a form normally lacking in significant tensile or tear strength.

From the supply roll 51 the film is preferably trained around a small idler roller 53 on the frame stand 26 to a bonding roll 55. The bonding roll 55 is freely mounted on an axle 56 supported between forwardly extending side hangers 57 of the frame structure 29. The rearward end of each side hanger 57 is pivotally attached to a bracket 58 secured to a frame member 27 just below the bracket 39 for the cylinder adjustment mechanism (described above).

The bonding of the film 50 the full width of the surface or face of cylinder 20 may utilize the difference in thermal properties of the foam and film, or adhesive securing techniques could be employed. As shown, assuming that the cylinder 20 is a foamed plastic mass of urethane and the film 50 is vinyl, the bonding roll 55 is water cooled by suitable means (not shown) to provide a "cold roll".

Extending between the upper end of each side hanger 57 is a bracket mounted manifold 59 for supply of inflammable gas from a jet 60 to a burner 61 intended to direct an open flame across the face of the film 50 trained around the bonding roll 55. It has been found that when one side of a very thin vinyl film 50 is exposed to an open flame, while the other side of the vinyl film 50 is in contact with a "cold" roll 55, the flame exposed side will soften and become thermally adhesive without softening of the "cold" side or significant loss of tensile strength. It has further been found that bringing the "softened" side of the vinyl film 50 immediately thereafter into full face contact with the surface of the urethane foam cylinder 20 will result in an adherence of the film to the foam, yet without damage to the structural integrity of either the foam or the film. To assist in adhering the film to the foam, a blast of cool air may be directed against the bonded film layer from a cooling duct 62 carried on side hangers 57.

The side hangers 57 are pivotally mounted so that a chain 63 trained over a pulley 64 on the frame member 28 and carrying a small counterweight 65 will bias the bonding roll 55 upwardly against the surface of the foam as the diameter of the cylinder 20 decreases during the article producing operations. Maintenance of a constant and full face pressure on the bonding roll 55 is important to ensure proper softening of the film 50 and uniform adherence of the film to the foam, and to provide appropriate back tension against the surface of the cylinder when rotating during the article producing operations, as further described below.

Other techniques for thermally softening the film 50, such as infra red or "heat" lamps, could be used if desired. If adhesive techniques are chosen for the bonding operation, any suitable adhesive compatible with the film and the foam could be used, so long as the adhesive may be thinly applied and will dry or set very quickly.

The laminate article of foam and film, indicated generally at 70 (see FIG. 2), is continuously severed from the surface of a foam cylinder 20 linearly along the entire transverse width thereof in the area of the imaginary line indicated by the letter B. The cutting mechanism includes a blade channel 71 (see FIG. 4) mounted between the frame members 27 just below the bracket 39 for the cylinder adjustment mechanism (described above). The cutting blade 72 which slides within the channel 71 is preferably an endless band. The blade 72 is trained around two large pulleys 73 (only one of which is shown). The drive pulley 73 is mounted on the output shaft of a transmission unit 75 driven by an electric motor 76. The motor and transmission unit are mounted on the frame structure 30 extending to the side of frame member 27.

In operation, the motor 76 is continually driven to move the cutting blade 72 radially inwardly of the surface of the foam cylinder 20 and sever the laminate 70. As described above, the motor 47 is also continually driven to space the foam cylinder in relation to the blade 72 during the cutting operation. As best seen in FIG. 4, the thickness of the cut foam layer is determined by the extent to which the surface or face of the foam cylinder is positioned radially outwardly of the edge of the blade 72 (radially outwardly along line B). The spacing shown may be increased a reasonable amount to produce a relatively thick (e.g. one-quarter or one-half inch) foam layer, as desired. More important, however, the relative spacing between the surface of the foam cylinder and the cutting blade may be adjusted so precisely that the foam of a laminate 70, with the film of reinforcing material 50 bonded thereto providing critical rigidity along the line of severance, may be cut as thin as 10 to 12 mils. in a commercial article producing operation.

The severed laminate 70 is trained around a driven roll 80 preferably positioned immediately below the cutting blade 72. The axle 81 of the driven roll is journaled in the brackets 58 (described above) and may also act as the pivot point for the side hangers 57 (described above) carrying the bonding roll 55.

To provide sufficient bight against roll 80 to pull the laminate 70 away from the cylinder of foam, a second driven roll 82 is positioned below the roll 80. The axle of the second driven roller is journaled in small brackets 83 attached to the frame members 27.

A transmission unit 85 located at the rear frame structure 31 and driven by electric motor 86 drives the rollers 80 and 82 through a power linkage including a transmission output shaft 87, a large sprocket 89 journaled in brackets 91 attached to one side of the frame structure 31, and a connecting chain 92. The sprocket 89 drives bevel gear 93 which meshes with a mating bevel gear 94 carried on the rear end of a long horizontal shaft 95 journaled in flange brackets 96 attached to the frame structure 31. The forward end of shaft 95 carries a similar bevel gear 97 which meshes with a mating bevel gear 98 carried on the lower end of a short vertical shaft 99 journaled at the lower end in the forward flange bracket 96 and at the upper end in a shelf bracket 101 attached to frame structure 30.

The upper end of shaft 99 carries a bevel gear 102 which meshes with a bevel gear 103 on the outer end of a shorter transverse shaft 104 also journaled in the shelf bracket 101. The drive 104 drives a sprocket 105 which carries a drive chain 106 trained around a sprocket 107 mounted on the end of the axle 81 of the upper roll 80. Inside of a frame member 27 (see FIG. 3), rotation of the lower roll 82 is correspondingly coordinated with rotation of the upper roll 80 by a chain 108 and sprockets mounted on axles 81 and 83. Thereby, the motor 86 is driven to rotate rolls 80 and 82, thereby rotating the foam cylinder 20, so that the surface thereof moves toward and past the bonding roll 55 and cutting blade 72, preferably by a force transmitted solely through the severed laminate 70.

After passage around the lower roll 82, the laminate 70 is tracked rearwardly on a runout table 109 mounted above frame structure 31 to a winding mandrel 110. The mandrel 110 is intended to coil the severed laminate 70 of foam and film, if desired. Alternatively, the laminate 70 could be directed toward further processing, or sliced into flat sheets, or the film 50 could be removed leaving only the thin layer of cut foam, whichever is required to fulfill the purposes for which the foamed plastic material has been produced.

As shown, the mandrel 110 has a suitable provision (not shown) for attachment of the leading end of a severed laminate 70 at commencement of operations described above. Each end of mandrel 110 has a shaft extension 111 which carries a double flanged roller 112 adapted to engage a rail surface 113 mounted on top of an upwardly inclined rail support 114. As best shown in FIG. 1, the mandrel 110 is rotated to wind up the laminate 70 by the frictional contact of a driven roll 115. The axle 116 of roll 115 is journaled between the brackets 91 and a similar bracket on the opposite side of the frame structure 31. The roll 115 is driven by rotation of the large sprocket 89 and is thereby coordinated with rotation of the rolls 80 and 82.

The surface of roll 115 contacts the laminate 70 and thereby rotates the mandrel 110 in a manner such as to uniformly wind the laminate in coil form without distortion or damage. The angle of upward inclination for the rail supports 114 is selected so that the build up of a coil of laminate 70 (shown by chain line in FIG. 1) will be unhampered.

SUMMARY

A preferred form of apparatus with a detailed description of the various elements and the operating relation thereof has been made above. Further, the concepts of the invention may also be understood by a description of operation which refers only generally to the form of apparatus as described above.

The cylinder of foam idly rotates on an axis. As shown in FIG. 1, the letter A indicates a "first imaginary line" extending radially of the cylinder axis in the area of the bonding roll 55. As shown in FIG. 4, the letter B indicates a "second imaginary line" also extending radially of the cylinder axis in the area of the cutting blade 72. The axis of the bonding roll 55 and the cutting edge of the blade 72 are separated by approximately 60° on an arc swung about the cylinder axis. Therefore, even though the cylinder axis is moved toward the cutting blade by the adjusting rod 40 as the cylinder diameter decreases (as described above), the first and second imaginary lines, A and B, will be separated by an arc of approximately 60°.

Also as shown in FIG. 4, the driven roll 80 is located below the cutting blade at a constant distance. The letter C indicates a preferred "tension point" or area radially outwardly of the cylinder axis, and also radially outwardly of line B.

Therefore, the invention includes the concepts of: rotating a cylinder of foam about an axis so that the surface or face of the cylinder continually moves toward and past first and second imaginary lines (A and B) each extending radially of the cylinder axis and transversely of the surface of the cylinder; the film or layer 50 is bonded to the rotating cylinder in the area of line A; the laminate 70 of foam and film is severed by cutting radially inwardly of the surface of the rotating cylinder in the area of line B; and, tension is applied to the severed laminate from point C.

There have been shown and described herein the best forms of the invention. However, it will be understood that modifications and changes may be made within the scope of the invention without departing from the spirit thereof, the invention being measured by the appended claims and not by details of the specification.

What is claimed is:

1. A process for producing a laminate of urethane foam having a vinyl resin film backing comprising the steps of, freely rotatably mounting a cylinder of urethane foam, continuously heating one side of a sheet of vinyl resin film, simultaneously cooling the other side of said film, continuously applying the heated side of said film to the surface of said cylinder under pressure while continuing to cool the other side of said film, cutting inwardly of the surface of said cylinder linearly and transversely the entire width thereof to sever a laminate of said foam and said film, and positively displacing said severed laminate to rotate said cylinder and provide a constant output of the laminate.

2. A process for producing a laminate of urethane foam having a vinyl resin film backing comprising the steps of, freely rotatably mounting a cylinder of urethane foam, continuously heating one side of a sheet of vinyl resin film, simultaneously cooling the other side of said film to maintain the tensile characteristics substantially unaltered, continuously applying the heated side of said film to the surface of said cylinder under pressure, maintaining the cooling while said film is applied to said cylinder under pressure, further cooling said film after application to said cylinder to improve the adhesion of the bond, cutting inwardly of the surface of said cylinder linearly and transveresly the entire width thereof to sever a laminate of said foam and said film, and positively displacing said laminate to rotate said cylinder and provide a constant output of the laminate.

References Cited by the Examiner
UNITED STATES PATENTS

| | | | |
|---|---|---|---|
| 2,224,370 | 12/1940 | Wescott | 156—311 |
| 2,226,953 | 12/1940 | Straus | 156—255 |
| 2,607,712 | 8/1952 | Sturken | 154—1 |
| 2,626,886 | 1/1953 | Scholl | 154—103 |
| 2,690,206 | 9/1954 | Mueller | 154—1 |
| 2,732,324 | 1/1956 | Morris | 154—103 |
| 2,841,205 | 7/1958 | Bird | 156—254 |
| 2,879,197 | 3/1959 | Muskat et al. | |
| 2,956,310 | 10/1960 | Roop et al. | |
| 3,062,698 | 11/1962 | Aykanian | 156—311 |

FOREIGN PATENTS

| | | |
|---|---|---|
| 208,065 | 3/1960 | Austria. |

EARL M. BERGERT, *Primary Examiner.*

CARL F. KRAFFT, *Examiner.*